United States Patent
Normile

(10) Patent No.: US 9,245,028 B2
(45) Date of Patent: Jan. 26, 2016

(54) SYSTEM AND METHOD TO IDENTIFY MACHINE-READABLE CODES

(71) Applicant: eBay Inc., San Jose, CA (US)

(72) Inventor: Tom Normile, Palo Alto, CA (US)

(73) Assignee: eBay Inc., San Jose, CA (US)

( * ) Notice: Subject to any disclaimer, the term of this patent is extended or adjusted under 35 U.S.C. 154(b) by 23 days.

(21) Appl. No.: 14/072,615

(22) Filed: Nov. 5, 2013

(65) Prior Publication Data

US 2014/0067787 A1 Mar. 6, 2014

Related U.S. Application Data

(63) Continuation of application No. 13/407,556, filed on Feb. 28, 2012, now Pat. No. 8,579,187.

(51) Int. Cl.

| G06F 17/00 | (2006.01) |
| G06F 19/00 | (2011.01) |
| G06Q 30/00 | (2012.01) |
| G06F 17/30 | (2006.01) |
| G06Q 30/06 | (2012.01) |
| G06Q 30/02 | (2012.01) |

(52) U.S. Cl.
CPC .... *G06F 17/30864* (2013.01); *G06F 17/30899* (2013.01); *G06F 17/3089* (2013.01); *G06Q 30/00* (2013.01); *G06Q 30/02* (2013.01); *G06Q 30/0601* (2013.01)

(58) Field of Classification Search
CPC .............. G06F 17/30864; G06F 17/30879; G06F 17/3089; G06Q 30/00; G06Q 30/0267

USPC ......... 235/375, 379, 380, 381, 382, 383, 385; 705/27.1

See application file for complete search history.

(56) References Cited

U.S. PATENT DOCUMENTS

| 8,579,187 B2 | 11/2013 | Normile |
| 2002/0161745 A1 | 10/2002 | Call |
| 2005/0160014 A1 | 7/2005 | Moss |
| 2008/0215557 A1* | 9/2008 | Ramer et al. .................. 707/4 |
| 2009/0265251 A1 | 10/2009 | Dunlap et al. |
| 2010/0057586 A1 | 3/2010 | Chow |
| 2011/0078487 A1* | 3/2011 | Nielsen et al. ................ 714/2 |

(Continued)

OTHER PUBLICATIONS

"U.S. Appl. No. 13/407,556 , Response filed May 7, 2013 to Non Final Office Action mailed Feb. 7, 2013", 13 pgs.

(Continued)

*Primary Examiner* — Thien M Le
*Assistant Examiner* — Claude J Brown
(74) *Attorney, Agent, or Firm* — Schwegman Lundberg & Woessner, P.A.

(57) ABSTRACT

A method and a system to identify machine-readable codes using a web crawler are provided. Machine-readable codes include, but are not limited to, Universal Product Codes (UPC), quick response (QR) codes, stock-keeping units (SKUs) and international standard book number (ISBN) codes. A web crawler downloads pages from the World Wide Web. A determination module accesses the downloaded pages and identifies a machine-readable code corresponding to a product description included in the downloaded pages. The machine-readable code is included in a downloaded page of the downloaded pages. The determination module further extracts the product description from the downloaded page. A code database stores a record of the machine-readable code and the product description.

16 Claims, 6 Drawing Sheets

(56) References Cited

U.S. PATENT DOCUMENTS

| | | |
|---|---|---|
| 2012/0072409 A1 | 3/2012 | Perry et al. |
| 2012/0123910 A1 | 5/2012 | George |
| 2013/0221085 A1 | 8/2013 | Normile |

OTHER PUBLICATIONS

"U.S. Appl. No. 13/407,556, Non Final Office Action mailed Feb. 7, 2013", 12 pgs.

"U.S. Appl. No. 13/407,556, Notice of Allowance mailed Jul. 9, 2013", 8 pgs.

\* cited by examiner

| UPC | PRODUCT |
|---|---|
| ABC124 | 14oz. Green Beans |
| DEF456 | 16 oz. Lentils |
| GHI789 | <unknown> |
| | |
| | |
| | |
| | |
| | |
| | |
| | |
| | |
| | |
| | |

218
SYSTEM AND METHOD TO IDENTIFY MACHINE-READABLE CODES

CROSS-REFERENCE TO RELATED APPLICATIONS

This application is a continuation of U.S. application Ser. No. 13/407,556 filed Feb. 28, 2012, entitled "SYSTEM AND METHOD TO IDENTIFY MACHINE-READABLE CODES," which is incorporated herein by reference in its entirety.

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice applies to the software and data as described below and in the drawings that form a part of this document: Copyright eBay, Inc. 2011, All Rights Reserved.

TECHNICAL FIELD

The present application relates generally to the technical field of network communications and, in one specific example, to a system and method to identify machine-readable codes.

BACKGROUND

Machine-readable codes, such as barcodes, Universal Product Codes (UPC), quick response (QR) codes, stock-keeping units (SKUs) and international standard book number (ISBN) codes are used to mark a product for sale. The machine-readable code is scanned by a code reader. The code reader then accesses a database to provide a human-readable description of the product to a user of the code reader.

BRIEF DESCRIPTION OF THE DRAWINGS

Some embodiments are illustrated by way of example and not limitation in the figures of the accompanying drawings in which.

DETAILED DESCRIPTION

Example methods and systems to identify a machine-readable code are described. In the following description, for purposes of explanation, numerous specific details are set forth in order to provide a thorough understanding of example embodiments. It will be evident, however, to one skilled in the art that the present invention may be practiced without these specific details.

When a machine-readable code is scanned by a code reader, the code reader accesses a database to identify a product associated with the code. Typically, the code reader translates the machine-readable code into a series of alphanumeric characters that is recorded in the database and associated with the product to which the machine-readable code is assigned. As used herein, the term "machine-readable code" is used interchangeably with the sequence of alphanumeric characters that is encoded by the machine-readable code, except as noted.

In some instances, the machine-readable code or the series of alphanumeric characters is not recorded in the database accessed by the code reader. Further, the database may not yet include a record of new products. Typical systems prepare and submit a search query for unknown machine-readable codes, but this process is computationally intensive. In example embodiments, a web crawler is described that crawls websites to identify products based on a machine-readable code, such as a UPC symbol. As the crawler identifies a machine-readable code or a series of alphanumeric characters encoded by a machine-readable code, a determination is made as to whether to add a record of the machine-readable code to the database.

Accordingly, one or more of the methodologies discussed herein may obviate a need for computationally intensive queries, which may have the technical effect of reducing computing resources used by one or more devices within the system. Examples of such computing resources include, without limitation, processor cycles, network traffic, memory usage, storage space, and power consumption.

Figure 1:
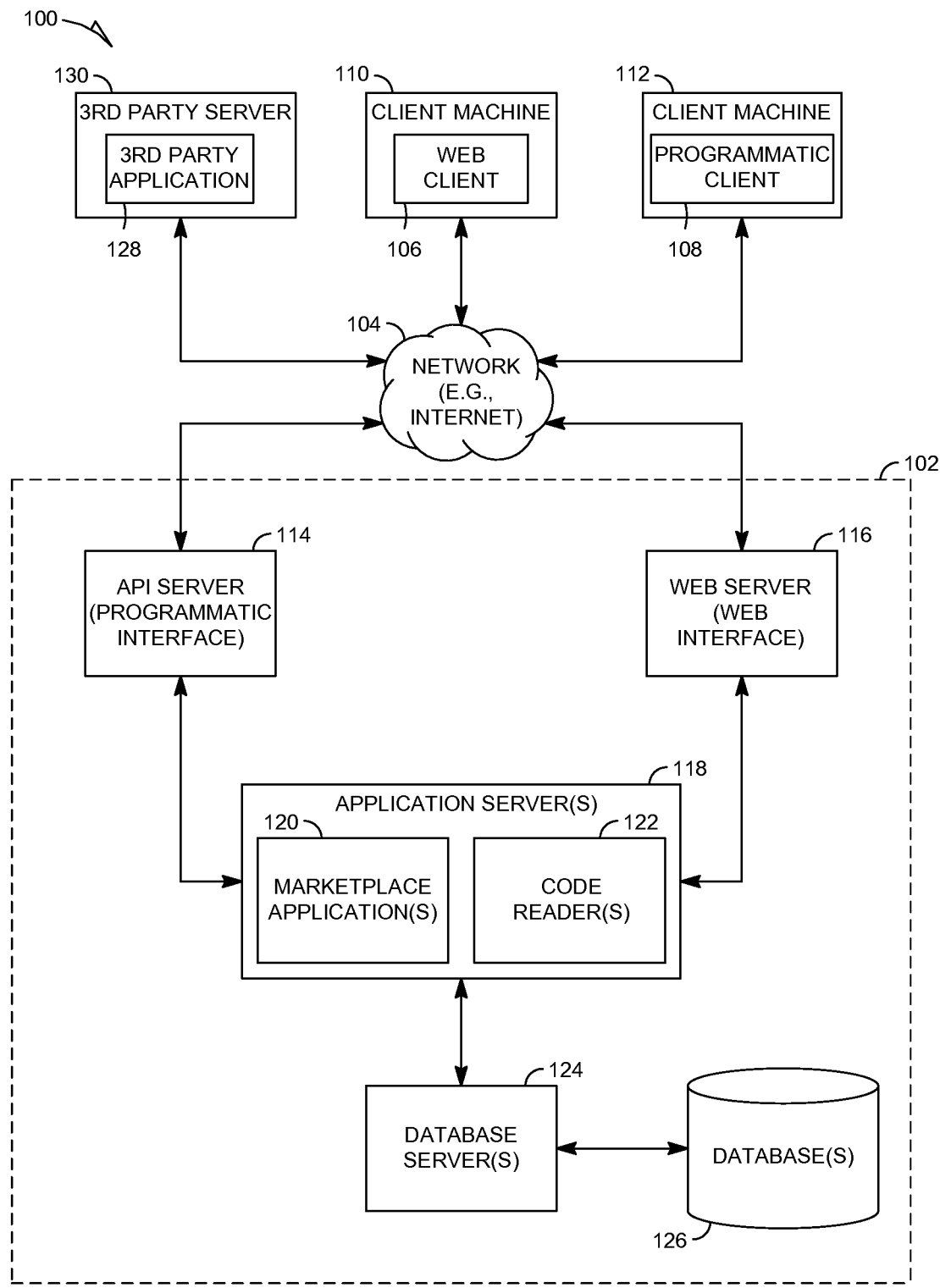
FIG. 1 is a network diagram depicting a client-server system, within which one example embodiment may be deployed.

FIG. 1 is a network diagram depicting a client-server system 100, within which one example embodiment may be deployed. A networked system 102, in the example forms of a network-based marketplace or publication system, provides server-side functionality, via a network 104 (e.g., the Internet or Wide Area Network (WAN)) to one or more clients. FIG. 1 illustrates, for example, a web client 106 (e.g., a browser), and a programmatic client 108 executing on respective client machines 110 and 112.

An Application Program Interface (API) server 114 and a web server 116 are coupled to, and provide programmatic and web interfaces respectively to, one or more application servers 118. The application servers 118 host one or more marketplace applications 120 and code readers 122. The application servers 118 are, in turn, shown to be coupled to one or more databases servers 124 that facilitate access to one or more databases 126.

The marketplace applications 120 may provide a number of marketplace functions and services to users that access the networked system 102. The code readers 122 may likewise provide a number of code-reading services and functions to users. The code readers 122 may allow users to scan machine readable codes using a smart phone having a camera to identify products that are made available via the marketplace applications 120. While the marketplace applications 120 and code readers 122 are shown in FIG. 1 to both form part of the networked system 102, it will be appreciated that, in alternative embodiments, the code readers 122 may form part of a different service that is separate and distinct from the networked system 102.

Further, while the system 100 shown in FIG. 1 employs a client-server architecture, the present invention is of course not limited to such an architecture, and could equally well find application in a distributed, or peer-to-peer, architecture system, for example. The various marketplace applications 120 and code readers 122 could also be implemented as standalone software programs, which do not necessarily have networking capabilities.

The web client 106 accesses the various marketplace applications 120 and the code readers 122 via the web interface supported by the web server 116. Similarly, the programmatic client 108 accesses the various services and functions provided by the marketplace applications 120 and the code readers 122 via the programmatic interface provided by the API server 114. The programmatic client 108 may, for example, be a seller application (e.g., the TurboLister application developed by eBay Inc., of San Jose, Calif.) to enable sellers to author and manage listings on the networked system 102 in an off-line manner, and to perform batch-mode communications between the programmatic client 108 and the networked system 102.

FIG. 1 also illustrates a third party application 128, executing on a third party server machine 130, as having programmatic access to the networked system 102 via the programmatic interface provided by the API server 114. For example, the third party application 128 may, utilizing information retrieved from the networked system 102, support one or more features or functions on a website hosted by the third party. The third party website may, for example, provide one or more promotional, marketplace, or payment functions that are supported by the relevant applications of the networked system 102.

Figure 2:
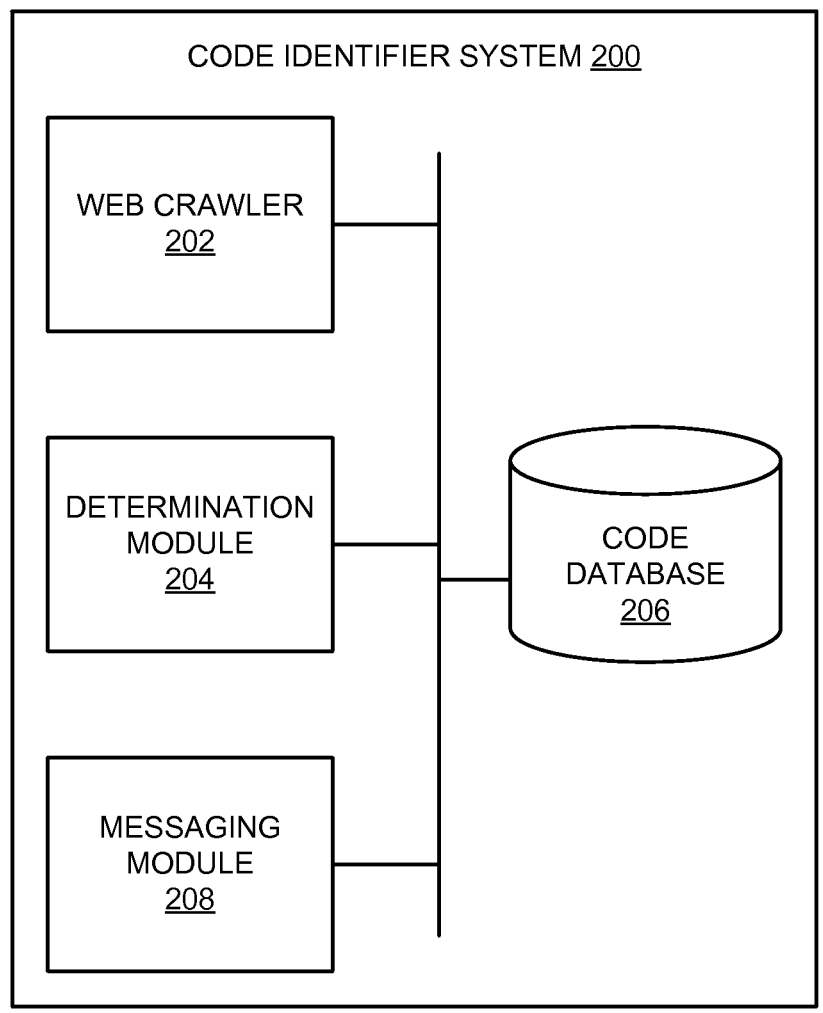
FIG. 2 is a block diagram of an example code identifier system, according to various embodiments.

FIG. 2 is a block diagram of an example code identifier system 200, according to various embodiments. The code identifier system 200 may form part of the code readers 122 of FIG. 1. The code identifier system 200 identifies machine-readable codes (or sequences of alphanumeric characters that correspond to the machine-readable codes) found on Internet websites and identifies a product description corresponding to the machine-readable code. By identifying the product description corresponding to the machine-readable code, the code readers 122 may later access the product description from a database in response to receiving a scan of the code from a user of the code reader.

A web crawler 202 is configured to crawl websites published on, for example, on the World Wide Web (WWW) and accessible via the Internet. The web crawler 202 is used to create a copy of all the visited pages for later processing by a determination module 204. The web crawler 202 starts with a list of uniform resource locators (URLs) to visit, referred to as "seeds." As the web crawler 202 visits these URLs, it identifies all the hyperlinks in the page and adds them to the list of URLs to visit. The added URLs are recursively visited according to a set of policies. The web crawler may access various policies to prioritize which URLs to crawl or to add as seeds. One example policy may prioritize visiting the website based on a number of machine-readable codes previously retrieved from the website. Another example policy may prioritize URLs based on a number of newly identified machine-readable codes previously retrieved from the website. A third example policy may blacklist URLs from which no (or very few) machine-readable codes have been identified.

The determination module 204 accesses the pages downloaded by the web crawler 202 and records the machine-readable codes appearing on the downloaded pages along with the product description corresponding to the respective machine-readable codes appearing on those pages. The determination module 204 may first extract a machine-readable code from the downloaded pages based on, for example, an field identifier such as those used in hypertext mark-up language (HTML). In some embodiments, the machine-readable code may be extracted based on image recognition of the machine-readable code itself. In other embodiments where the sequence of alphanumeric characters that correspond to the machine-readable code is published on the downloaded page, the determination module 204 may identify the sequence as a machine-readable code based, for example, on the number of characters, on a mixture of the numbers and letters appearing in the sequence, and on whether any known sub-sequences appear in the machine-readable code. A sub-sequence may identify a brand of the product, a type of product (e.g., "shoes"), a genre of a book, or the like.

In other instances, a machine-readable code may be received by the determination module 204 from a user of a code reader 122. The user may scan a code but a database 126 may be lacking a description of the product corresponding to the scanned code. In such instances, the determination module 204 may record the machine-readable code in a code database 206 accessible to the determination module 204 without a corresponding product description. Additional information about the scan may also be recorded such as a time stamp indicating when the code was scanned, a location of the user when the code was scanned, an user identifier identify a user who provided the scan, contact information of the user, or the like.

Upon extracting a machine-readable code from a downloaded page, the determination module 204 is configured to determine whether the machine-readable code is already recorded in a code database 206. The code database 206 records each machine-readable code and a corresponding product description. If the code is already stored, the machine-readable code is not recorded. If the code is not yet recorded, the code is recorded in the code database 206 by the determination module 204 without a corresponding product description.

The determination module 204 is further configured to record a product description corresponding to the machine-readable code. The determination module 204 may be configured to extract product information from the downloaded page, such as a description appearing in one or more fields (e.g., HTML fields), images include in the downloaded page, or the like. The determination module 204 may, upon receiving some product information about the product corresponding to the machine-readable code, initiate a search at a search engine for additional information using a search query generated using the product information. A search result may then be automatically selected. Using the page corresponding to the search result, additional product information may be added to the code database 206.

In some instances, the code identifier system 200 may further include an optional messaging module 208. In instances where a user of the code reader 122 has scanned the machine-readable code but no product information was available in the database 126 or the code database 206 corresponding to the scanned code, the messaging module 208 may send a message to the user when product information is eventually recorded. The product information may be recorded in the database 126 or the code database 206 by the determinations module 204. The messaging module 208 may send the message as, for example, an email, a text message, a multi-media message, or some other electronic message. In some instances, the message may include information indicating when the machine-readable code was scanned by the user or where the user was when the machine-readable code was scanned. The message may include a link to the product information or may itself include the product information.

Figure 3:
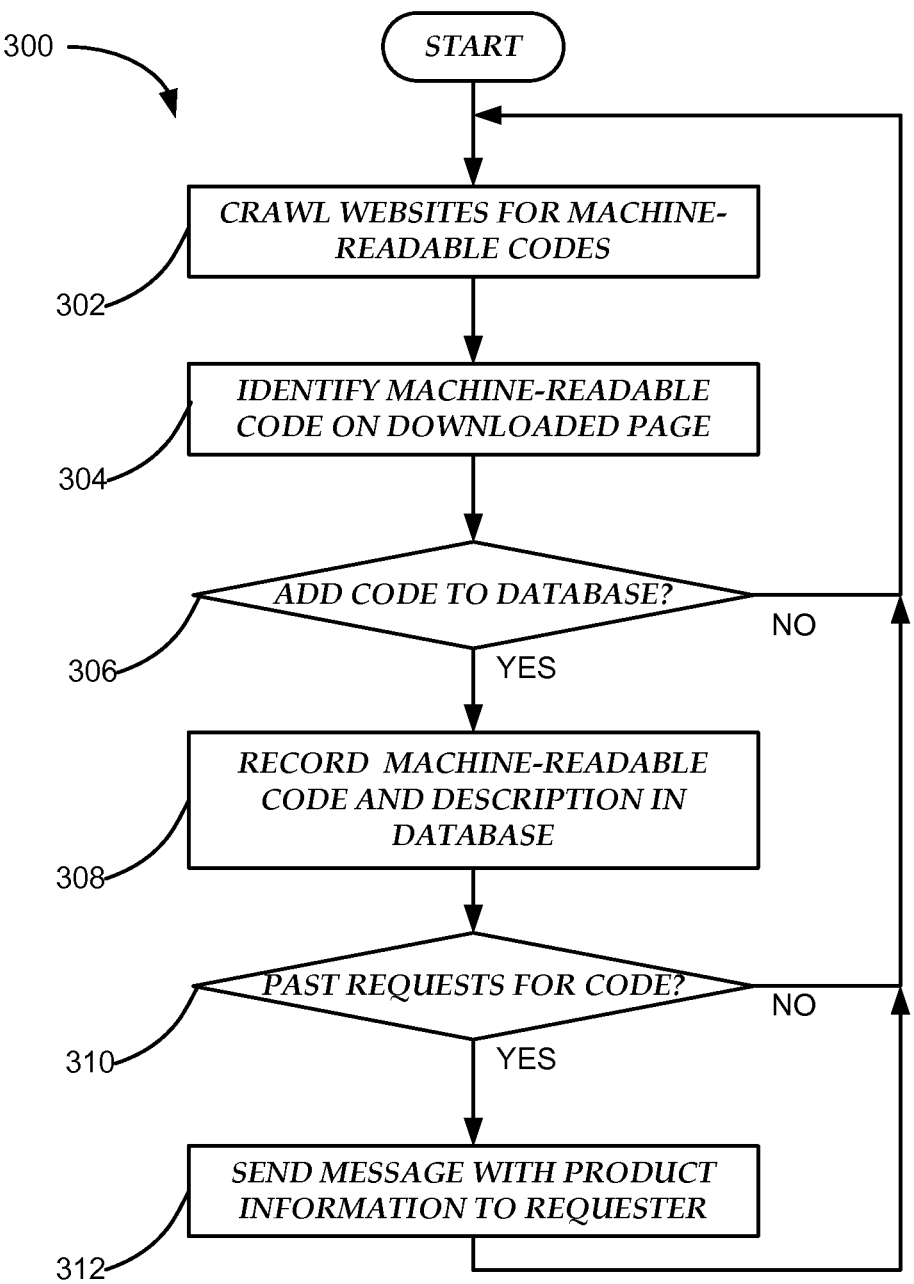
FIG. 3 is a flowchart illustrating an example method of identifying codes, according to various embodiments.

FIG. 3 is a flowchart illustrating an example method 300 of identifying codes, according to various embodiments. The method 300 may be performed by the code identifier system 200.

In an operation 302, websites are crawled to download pages that include the machine-readable codes by the web crawlers 202. The websites may be crawled according to one or more polices tailored to downloading pages likely to include product codes. In some instances, certain websites may be crawled more often than others.

In an operation 304, a machine-readable code is identified or extracted from a downloaded page by the determination module 204. The machine-readable code may alternatively be identified based on a submission of a product code received from a user of the code reader 122. The machine-readable code may be decoded to reveal the sequence of alphanumeric characters encoded within the machine-readable code.

In an operation 306, a determination is made as to whether to add the machine-readable code to a database (e.g., code database 206) by the determination module 204. If the code is already recorded in the database, the determination may result in not recording the code in the database to avoid duplicate entries and the method 300 returns to operation 302.

If the machine-readable code is stored in the database, the code and the accompanying product description included in the downloaded page are added to the database in an operation 308. If the code was submitted by a user, the code may be stored in the database without a corresponding product description.

In an operation 310, a determination is made as to whether the code reader 122 has received requests for the product information corresponding to the stored code. The past requests may be stored according to a user identifier identifying the user who previously submitted the machine-readable code. If there are no past requests for the machine-readable code, the method 300 returns to operation 302. If there are past requests for the machine-readable code, a message with the product information corresponding to the machine-readable code is sent to the requester by the messaging module 208, in an operation 312.

Figure 4:
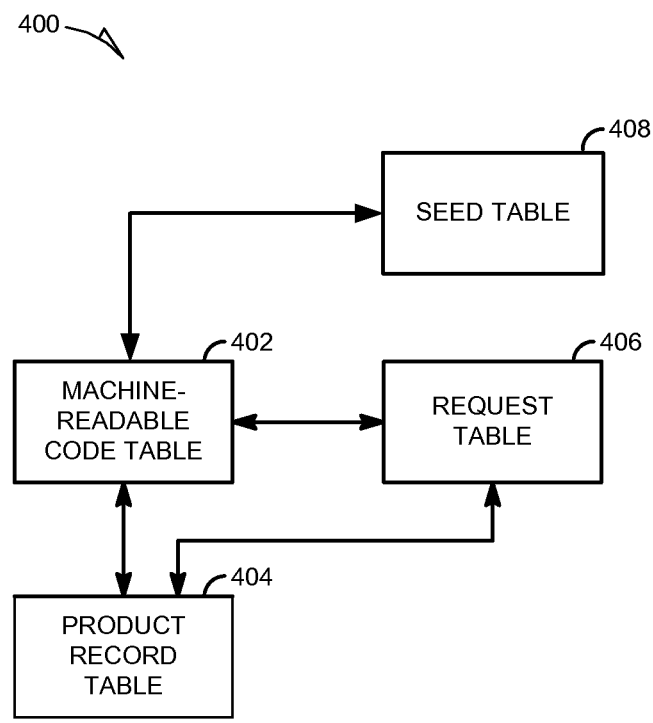
FIG. 4 is a high-level entity-relationship diagram, illustrating various tables that may be maintained within the databases, and that are utilized by and support the code identifier.

FIG. 4 is a high-level entity-relationship diagram 400, illustrating various tables that may be maintained within the databases, and that are utilized by and support the code identifier. A machine-readable code table 402 contains a record for each machine-readable code identified by the determination module 204. The machine-readable code table 402 may store the machine-readable code in its machine-readable form or may store the machine-readable code as the sequence of alphanumeric characters encoded by the machine-readable code. The machine-readable code table 402 may record the product information corresponding to the machine-readable code. In some embodiments, the product information or more detailed product information may be stored in a product record table 404. The product record table 404 may additionally include pointers or links to images of the product. A request table 406 may store records identifying users who have previously submitted a particular machine-readable code. The record may include a timestamp and/or location corresponding to the submission.

A seed table 408 may be optionally included in the tables. The seed table 408 may include URLs of websites used by the web crawler 202 to begin downloading pages.

Figure 5:
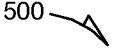
FIG. 5 provides further details regarding pertinent tables that are shown in FIG. 4 to be maintained within the databases

FIG. 5 provides further details regarding pertinent tables that are shown in FIG. 4 to be maintained within the databases. A table 500 stores records of a sequence of alphanumeric characters comprising a machine-readable code (e.g., a UPC symbol) and a corresponding record that stores a product description (if available) corresponding to the sequence. As depicted, the sequence comprises six alphanumeric characters, but the sequence may comprise other numbers of alphanumeric codes. The product description, as depicted, includes a short text description of the product. The product description may include additional text or a link to additional information about the product including images, audio, and video. In one embodiment, the table 500 may be a part of the machine-readable code table 402.

Modules, Components and Logic

Certain embodiments are described herein as including logic or a number of components, modules, or mechanisms. Modules may constitute either software modules (e.g., code embodied (1) on a non-transitory machine-readable medium or (2) in a transmission signal) or hardware-implemented modules. A hardware-implemented module is tangible unit capable of performing certain operations and may be configured or arranged in a certain manner. In example embodiments, one or more computer systems (e.g., a standalone, client or server computer system) or one or more processors may be configured by software (e.g., an application or application portion) as a hardware-implemented module that operates to perform certain operations as described herein.

In various embodiments, a hardware-implemented module may be implemented mechanically or electronically. For example, a hardware-implemented module may comprise dedicated circuitry or logic that is permanently configured (e.g., as a special-purpose processor, such as a field programmable gate array (FPGA) or an application-specific integrated circuit (ASIC)) to perform certain operations. A hardware-implemented module may also comprise programmable logic or circuitry (e.g., as encompassed within a general-purpose processor or other programmable processor) that is temporarily configured by software to perform certain operations. It will be appreciated that the decision to implement a hardware-implemented module mechanically, in dedicated and permanently configured circuitry, or in temporarily configured circuitry (e.g., configured by software) may be driven by cost and time considerations.

Accordingly, the term "hardware-implemented module" should be understood to encompass a tangible entity, be that an entity that is physically constructed, permanently configured (e.g., hardwired) or temporarily or transitorily configured (e.g., programmed) to operate in a certain manner and/or to perform certain operations described herein. Considering embodiments in which hardware-implemented modules are temporarily configured (e.g., programmed), each of the hardware-implemented modules need not be configured or instantiated at any one instance in time. For example, where the hardware-implemented modules comprise a general-purpose processor configured using software, the general-purpose processor may be configured as respective different hardware-implemented modules at different times. Software may accordingly configure a processor, for example, to constitute a particular hardware-implemented module at one instance of time and to constitute a different hardware-implemented module at a different instance of time.

Hardware-implemented modules can provide information to, and receive information from, other hardware-implemented modules. Accordingly, the described hardware-implemented modules may be regarded as being communicatively coupled. Where multiple of such hardware-implemented modules exist contemporaneously, communications may be achieved through signal transmission (e.g., over appropriate circuits and buses) that connect the hardware-implemented modules. In embodiments in which multiple hardware-implemented modules are configured or instantiated at different times, communications between such hardware-implemented modules may be achieved, for example, through the storage and retrieval of information in memory structures to which the multiple hardware-implemented modules have access. For example, one hardware-implemented module may perform an operation, and store the output of that operation in a memory device to which it is communicatively coupled. A further hardware-implemented module may then, at a later time, access the memory device to retrieve and process the stored output. Hardware-implemented modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., Application Program Interfaces (APIs).)

Electronic Apparatus and System

Example embodiments may be implemented in digital electronic circuitry, or in computer hardware, firmware, software, or in combinations of them. Example embodiments may be implemented using a computer program product, for example, a computer program tangibly embodied in an information carrier, for example, in a machine-readable medium for execution by, or to control the operation of, data processing apparatus (e.g., a programmable processor, a computer, or multiple computers).

A computer program can be written in any form of programming language, including compiled or interpreted languages, and it can be deployed in any form, including as a stand-alone program or as a module, subroutine, or other unit suitable for use in a computing environment. A computer program can be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry, for example, a field programmable gate array (FPGA) or an application-specific integrated circuit (ASIC).

The computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that that both hardware and software architectures require consideration. Specifically, it will be appreciated that the choice of whether to implement certain functionality in permanently configured hardware (e.g., an ASIC), in temporarily configured hardware (e.g., a combination of software and a programmable processor), or a combination of permanently and temporarily configured hardware may be a design choice. Below are set out hardware (e.g., machine) and software architectures that may be deployed, in various example embodiments.

Example Machine Architecture and Machine-Readable Medium

Figure 6:
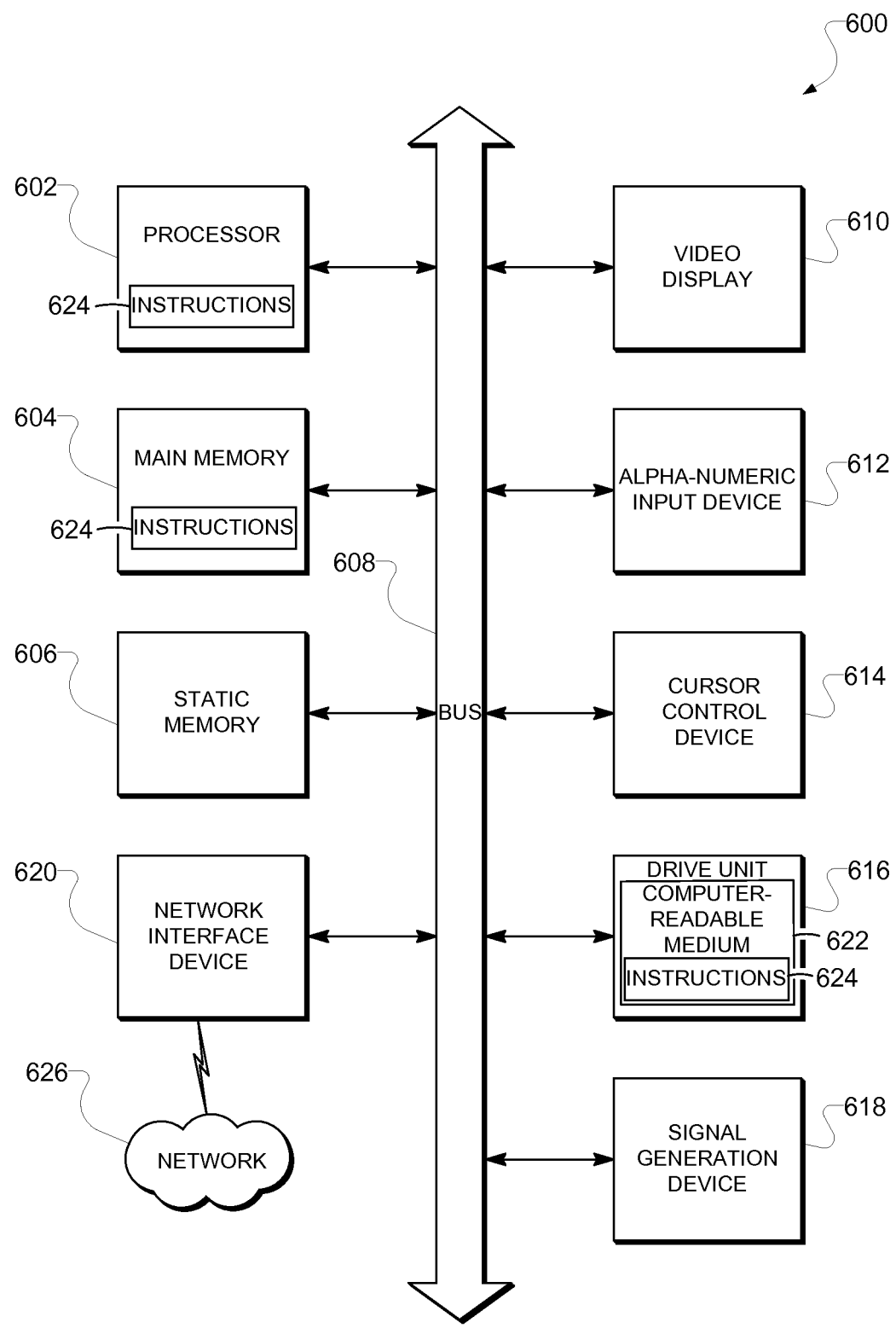
FIG. 6 is a diagrammatic representation of machine in the example form of a computer system within which a set of instructions, for causing the machine to perform any one or more of the methodologies discussed herein, may be executed.

FIG. 6 is a block diagram of machine in the example form of a computer system 600 within which instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 600 includes a processor 602 (e.g., a central processing unit (CPU), a graphics processing unit (GPU) or both), a main memory 604 and a static memory 606, which communicate with each other via a bus 608. The computer system 600 may further include a video display unit 610 (e.g., a liquid crystal display (LCD) or a cathode ray tube (CRT)). The computer system 600 also includes an alphanumeric input device 612 (e.g., a keyboard or a touch-sensitive display screen), a user interface (UI) navigation device 614 (e.g., a mouse), a disk drive unit 616, a signal generation device 618 (e.g., a speaker) and a network interface device 620.

Machine-Readable Medium

The disk drive unit 616 includes a machine-readable medium 622 on which is stored one or more sets of instructions and data structures (e.g., software) 624 embodying or utilized by any one or more of the methodologies or functions described herein. The instructions 624 may also reside, completely or at least partially, within the main memory 604 and/or within the processor 602 during execution thereof by the computer system 600, the main memory 604 and the processor 602 also constituting machine-readable media.

While the machine-readable medium 622 is shown in an example embodiment to be a single medium, the term "machine-readable medium" may include a single medium or multiple media (e.g., a centralized or distributed database, and/or associated caches and servers) that store the one or more instructions or data structures. The term "machine-readable medium" shall also be taken to include any tangible medium that is capable of storing, encoding or carrying instructions for execution by the machine and that cause the machine to perform any one or more of the methodologies of the present invention, or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices, e.g., Erasable Programmable Read-Only Memory (EPROM), Electrically Erasable Programmable Read-Only Memory (EEPROM), and flash memory devices; magnetic disks such as internal hard disks and removable disks; magneto-optical disks; and CD-ROM and DVD-ROM disks.

Transmission Medium

The instructions 624 may further be transmitted or received over a communications network 626 using a transmission medium. The instructions 624 may be transmitted using the network interface device 620 and any one of a number of well-known transfer protocols (e.g., HTTP). Examples of communication networks include a local area network ("LAN"), a wide area network ("WAN"), the Internet, mobile telephone networks, Plain Old Telephone (POTS) networks, and wireless data networks (e.g., WiFi and WiMax networks). The term "transmission medium" shall be taken to include any intangible medium that is capable of storing, encoding or carrying instructions for execution by the machine, and includes digital or analog communications signals or other intangible media to facilitate communication of such software.

Although an embodiment has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

What is claimed is:

1. A system comprising:
   one or more processors configured to:
      receive a request for a product description, the request including a machine-readable code;
      extract, based on image recognition of the machine-readable code appearing on a web page, the machine-readable code from the web page;
      determine the product description based on a crawling of the web page;
      make a determination whether the machine-readable code is stored in a database;
      based on the determination, either:
         in accordance with the determination being that the machine-readable code is not stored in the database, record the product description in a record of the database corresponding to the machine-readable code; or
         in accordance with the determination being that the machine-readable code is stored in the database, not record the product description in the database; and
      send a response to the request that includes the product description.

2. The system of claim 1, wherein the request for the product description includes contact information of a user making the request, and the response to the request is sent using the contact information.

3. The system of claim 2, wherein the request for the product description includes an indication of a location of the user when the request was made, and the response to the request includes the indication of the location of the user when the request was made.

4. The system of claim 1, wherein the request for the product description includes an indication of a time at which the request was made, and the response to the request includes the indication of the time at which the request was made.

5. The system of claim 1, the one or more processors further configured to:
   based on the crawling of the web page that includes the machine-readable code, initiate a search at a search engine for additional information; and
   modify the product description to include at least a portion of the additional information.

6. The system of claim 1 wherein:
   the request for the product description is received prior to the product description being recorded in the record of the database.

7. A non-transitory machine-readable medium that stores instructions, which, when performed by a machine, cause the machine to perform operations comprising:
   receiving a request for a product description, the request including a machine-readable code;
   extracting, based on image recognition of the machine-readable code appearing on a web page, the machine-readable code from the web page;
   determining product information based on a crawling of the web page;
   making a determination whether the machine-readable code is stored in a database;
   based on the determination, either:
      in accordance with the determination being that the machine-readable code is not stored in the database, recording the product description in a record of the database corresponding to the machine-readable code; or in accordance with the determination being that the machine-readable code is stored in the database, not recording the product description in the database; and sending a response to the request that includes the product description.

8. The non-transitory machine-readable medium of claim 7, wherein the request for the product description includes contact information of a user making the request, and the response to the request is sent using the contact information.

9. The non-transitory machine-readable medium of claim 8, wherein the request for the product description includes an indication of a location of the user when the request was made, and the response to the request includes the indication of the location of the user when the request was made.

10. The non-transitory machine-readable medium of claim 7, wherein the request for the product description includes an indication of a time at which the request was made, and the response to the request includes the indication of the time at which the request was made.

11. The non-transitory machine-readable medium of claim 7, the operations further comprising:

based on receiving the product information from the web crawler, initiating a search at a search engine for additional information; and modifying the product description to includes at least a portion of the additional information.

12. A method comprising:

receiving a request for a product description, the request including a machine-readable code;

extracting, based on image recognition of the machine-readable code appearing on a web page, the machine-readable code from the web page;

determining product information based on a crawling of the web page;

making a determination, by a processor of a machine, whether the machine-readable code is stored in a database;

based on the determination, either:

in accordance with the determination being that the machine-readable code is not stored in the database, recording the product description in a record of the database corresponding to the machine-readable code; or in accordance with the determination being that the machine-readable code is stored in the database, not recording the product description in the database; and sending a response to the request that includes the product description.

13. The method of claim 12, wherein the request for the product description includes contact information of a user making the request, and the response to the request is sent using the contact information.

14. The method of claim 13, wherein the request for the product description includes an indication of a location of the user when the request was made, and the response to the request includes the indication of the location of the user when the request was made.

15. The method of claim 12, wherein the request for the product description includes an indication of a time at which the request was made, and the response to the request includes the indication of the time at which the request was made.

16. The method of claim 12, further comprising:

based on receiving the product information from the web crawler, initiating a search at a search engine for additional information; and modifying the product description to includes at least a portion of the additional information.

\* \* \* \* \*